L. L. WILLIAMS.
COOKING UTENSIL.
APPLICATION FILED SEPT. 30, 1916.

1,219,686.

Patented Mar. 20, 1917.

Inventor
Laurence L. Williams
by Herbert W. Jenner
Attorney

UNITED STATES PATENT OFFICE.

LAURENCE LLEWELLYN WILLIAMS, OF SPRING CITY, PENNSYLVANIA.

COOKING UTENSIL.

1,219,686.  Specification of Letters Patent.  Patented Mar. 20, 1917.

Application filed September 30, 1916. Serial No. 122,998.

*To all whom it may concern:*

Be it known that I, LAURENCE L. WILLIAMS, a citizen of the United States, residing at Spring City, in the county of Chester and State of Pennsylvania, have invented certain new and useful Improvements in Cooking Utensils; and I do hereby declare the following to be a full, clear, and exact description of the invention, such as will enable others skilled in the art to which it appertains to make and use the same.

This invention relates to utensils used for frying oysters and other similar eatables; and it consists in the novel construction and combination of the parts hereinafter fully described and claimed.

Figure 1:
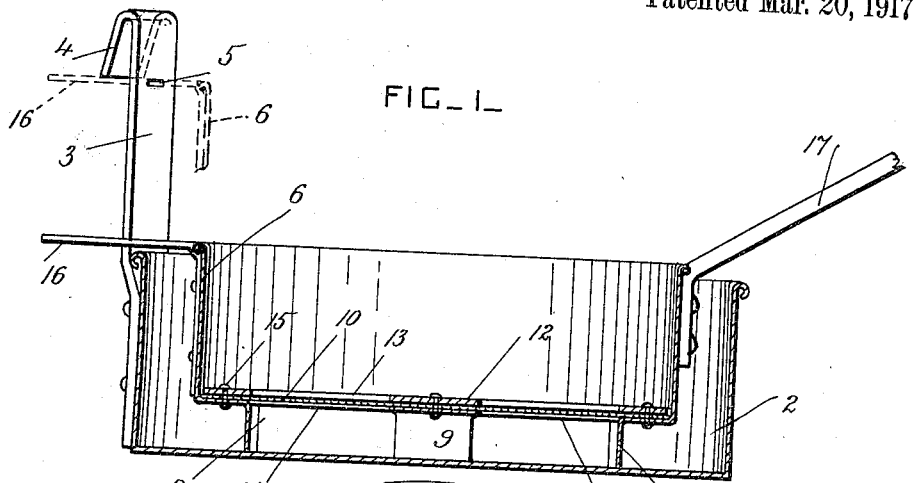
Figure 2:
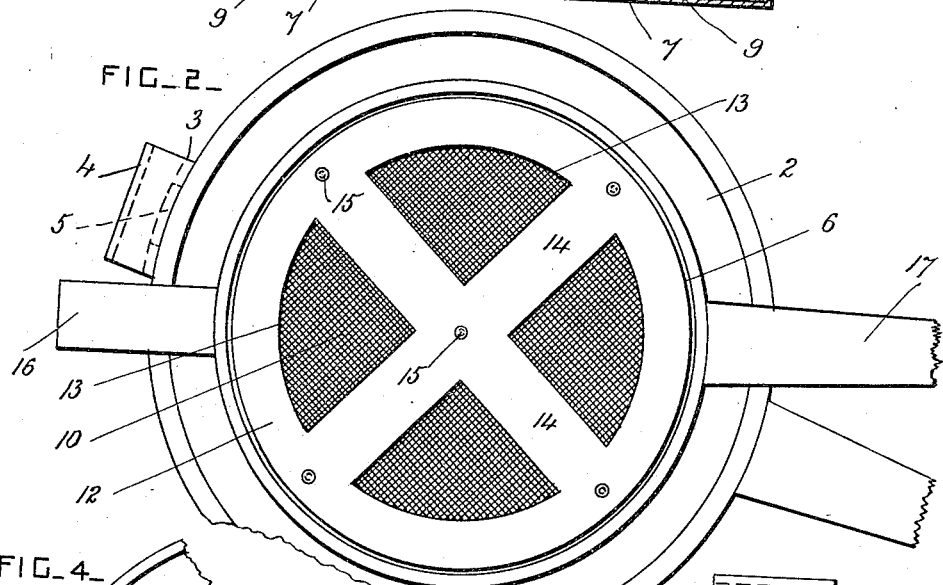
Figure 4:
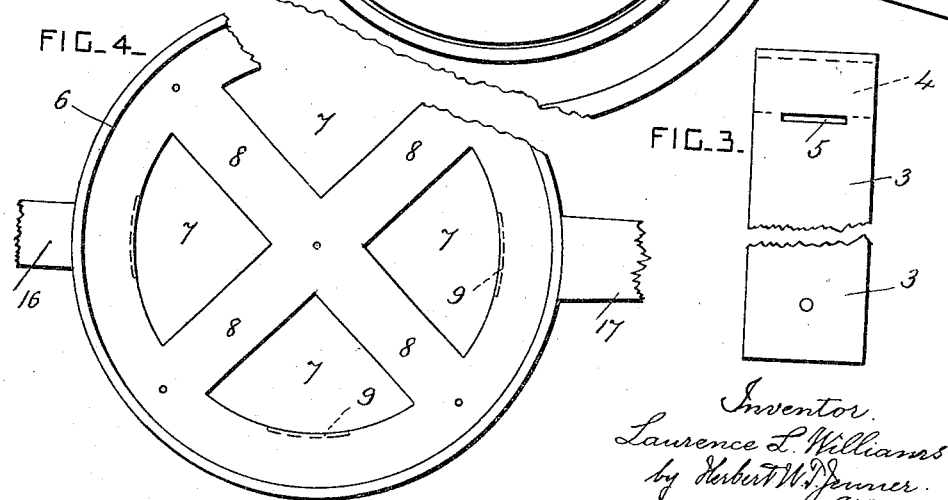
Figure 3:
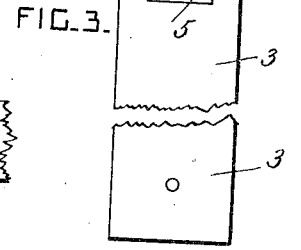

In the drawings, Figure 1 is a vertical section through a cooking utensil constructed according to this invention. Fig. 2 is a plan view of the utensil. Fig. 3 is a detail side view of the support secured to the frying pan. Fig. 4 is a plan view of the food rack with the strainer removed.

The frying pan 2 is of any approved construction, and is adapted to hold the heated fat. A support 3 is secured to one side of the frying pan and projects vertically above it, and is provided with a hook-shaped stop 4 at its upper end which is formed by bending the upper end portion of the support outwardly and downwardly. A slot 5 is formed horizontally in the main portion of the upright about level with the bottom of the stop.

A food rack 6 is provided for holding the oysters or other eatables, and supporting them in the hot grease clear of the bottom of the frying pan. This food rack is a shallow pan, preferably formed of aluminum, and it has openings 7 formed in its bottom, leaving narrow crossbars 8 between them. Portions of the metal cut away to form the openings 7 are bent downwardly and form legs 9 which rest on the bottom of the frying pan and support the food rack therein. A strainer 10, formed of very fine mesh wire cloth, is placed on the bottom of the food rack and rests upon the crossbars 8.

A ring or plate 12 having openings and crossbars, 13 and 14, which correspond with those of the bottom of the food rack, is placed over the wire gauze strainer, and this ring and the strainer are secured together and to the food rack in any convenient way. In the example shown the ring or plate 12 and the strainer are secured to the bottom of the food rack by rivets 15.

A laterally projecting arm 16 is secured to one side of the food rack, and a handle 17 is secured to its other side. The arm 16 is broad and relatively thin, and when the food rack is raised in the frying pan, the arm 16 is slid horizontally through the slot 5 in the support, so that its end portion engages with the end portion of the stop, as indicated by dotted lines in Fig. 1. The food rack is then supported over the frying pan, by the support, so that all surplus fat will drain out of it.

The arm 16 is formed to fit the slot so that the food rack does not slip laterally, but the arm is freely slidable into and out of engagement with the slot.

The fine mesh strainer prevents small particles of food from falling to the bottom of the frying pan, where they would become burnt so that they would discolor the fat and spoil the flavor of the food subsequently cooked by it.

What I claim is:

1. A cooking utensil, comprising a frying pan, a food pan having openings, legs and crossbars at its bottom, portions of the metal of the bottom cut away to form said openings being bent downwardly to form said legs which support the food pan in the frying pan, and a strainer supported by the said crossbars over the said openings.

2. A cooking utensil, comprising a frying pan having an upright at one side having an outwardly projecting hook-shaped stop at its top and a horizontal slot in its main portion, and a food pan having a strainer in its bottom and having a laterally projecting arm at one side, said arm being slidable in the said slot into engagement with the said stop, so that the food pan, when raised to drain off the grease, is wholly supported over the frying pan by the said upright.

In testimony whereof I have affixed my signature.

LAURENCE LLEWELLYN WILLIAMS.

Copies of this patent may be obtained for five cents each, by addressing the "Commissioner of Patents, Washington, D. C."